(No Model.)
T. & J. HUSMANN.
DEVICE FOR ATTACHING HAY LOADERS TO WAGONS.
No. 514,369. Patented Feb. 6, 1894.
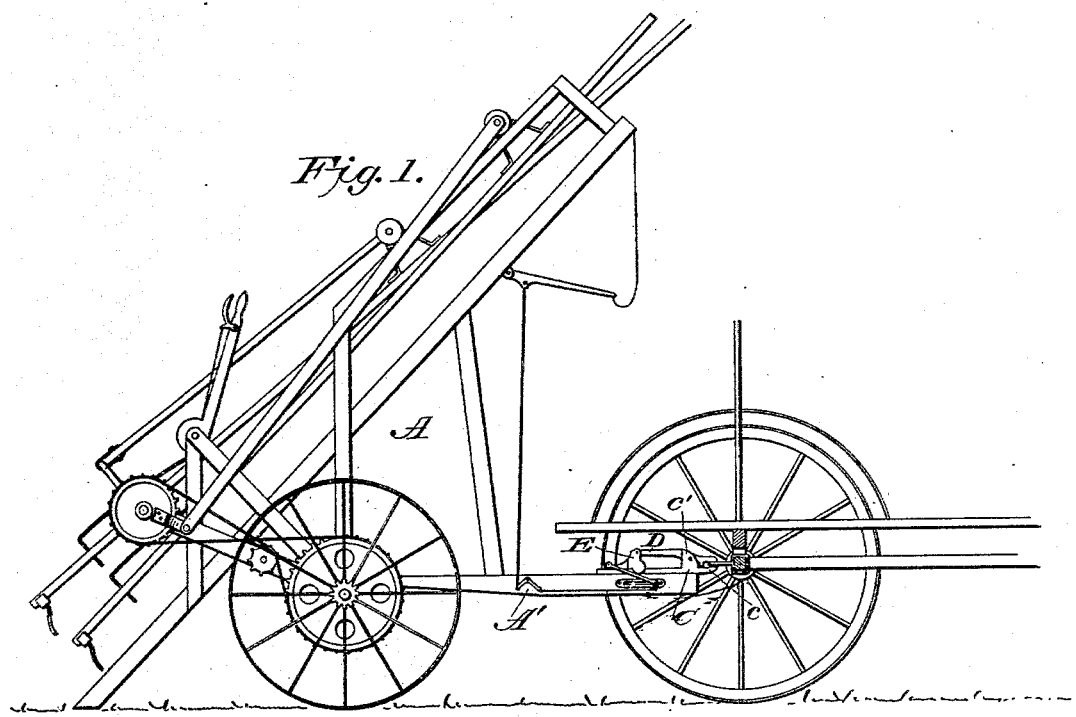
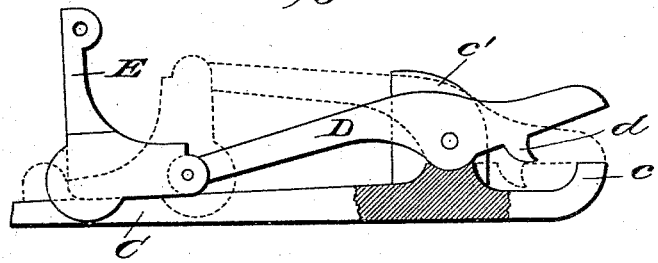
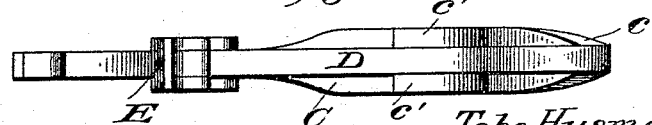
Tobe Husmann
John Husmann
INVENTORS
WITNESSES
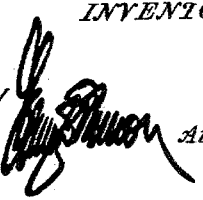

UNITED STATES PATENT OFFICE.

TOBE HUSMANN AND JOHN HUSMANN, OF SCOTCH GROVE, IOWA.

DEVICE FOR ATTACHING HAY-LOADERS TO WAGONS.

SPECIFICATION forming part of Letters Patent No. 514,369, dated February 6, 1894.

Application filed September 28, 1893. Serial No. 486,685. (No model.)

*To all whom it may concern:*

Be it known that we, TOBE HUSMANN and JOHN HUSMANN, citizens of the United States of America, residing at Scotch Grove, in the county of Jones and State of Iowa, have invented certain new and useful Improvements in Devices for Attaching Hay-Loaders to Wagons; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in coupling devices for connecting hay loaders to wagons.

The object of the invention is to provide an automatic device for connecting the hay loader to the wagon and means which extend to the upper part of the wagon for uncoupling the device when the wagon is loaded; and the invention consists in the construction and combination of the parts, as will be hereinafter fully set forth, and particularly pointed out in the claims.

In the accompanying drawings, forming part of this specification, Figure 1 is a side view showing the application of our improved coupling. Fig. 2 is a side elevation of the coupling detached from the hay loader, partly in section, and Fig. 3 is a plan view.

A designate a hay loader which may be of any suitable construction, and to the draft-bar A' of the same my improved coupling is adapted to be secured so that it can engage with an eye or staple attached to the rear axle or reach of the wagon upon which the hay is to be loaded from the aforesaid loader. The base or frame C of the coupling is rigidly secured to the draft-bar of the hay loader, and this frame is provided at its forward end with an upwardly projecting portion or hook $c$ with which the ring or eye attached to the wagon is adapted to engage. Rear of the hook the frame has upwardly projecting side pieces $c'$ between which is pivoted a lever D the forward end of which is adapted to lie over the hook $c$, while a short distance from the forward end of the lever is formed a depending portion $d$ against which the ring or eye on the wagon is adapted to strike when the forward end of the lever is up, so as to close the same upon the hook $c$, as shown in Fig. 2. The rear or long end of the lever is connected, pivotally, to an angular block E which is adapted to ride upon the frame C, the other end of the same being connected by a rod or rods to a lever pivoted at the upper part of the hay loader so that it may be operated from the top of the load of hay, or from the ground, to disconnect the hay loader from the wagon after the load has been placed thereon. The angular block E is of such construction that when positioned as shown in dotted lines Fig. 2 the short end of the lever will be held securely against the upwardly projecting portion $c$ of the base piece, and the block is adapted to be thrown in such position automatically when the ring or eye strikes the projection $d$ of the lever. After the wagon has been detached from the hay loader the coupling device will be retained in a position for coupling to another wagon without further adjusting the parts.

Having thus described our invention, what we claim as new, and desire to secure by Letters Patent, is—

1. In combination with a hay loader, a coupling device attached thereto comprising a base piece having an upwardly projecting end, a lever pivoted to said base piece said lever carrying means for locking the same in engagement with the forwardly projecting portion of the base piece, substantially as shown, and for the purpose set forth.

2. A coupling device comprising a base piece C having an upturned end $c$, a lever pivoted to said base piece, the long end of said lever carrying a block which is adapted to engage with the base piece rear of the pivot of the lever, substantially as shown, and for the purpose set forth.

3. A coupling device comprising a base piece having an upturned end and side pieces between which a lever is pivoted, the lower portion of the short end of the lever having a projection $d$, a block pivoted to the long end of the lever, two sides of said block being adapted to engage with the base piece so as to hold the lever locked or in a position to be locked when the projecting portion $d$ is engaged by a ring or eye, as set forth.

In testimony whereof we affix our signatures in presence of two witnesses.

TOBE HUSMANN.
JOHN HUSMANN.

Witnesses:
JOSEPH J. MILNE,
CLARENCE P. LATTA.